Figure 1:
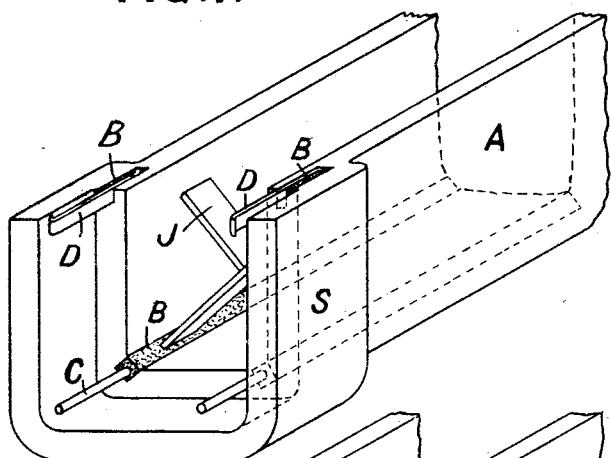

No. 696,737. Patented Apr. 1, 1902.
F. JONES.
CONDUIT FOR UNDERGROUND CONDUCTORS.
(Application filed Sept. 4, 1901.)
(No Model.) 2 Sheets—Sheet 1.

FIG. 1ª.

FIG. 2ª.

Witnesses
Albert Popkins
Grace P. Brereton

Inventor
Frank Jones
by Sturtevant & Hurley
Attorneys

No. 696,737. Patented Apr. 1, 1902.
F. JONES.
CONDUIT FOR UNDERGROUND CONDUCTORS.
(Application filed Sept. 4, 1901.)
(No Model.) 2 Sheets—Sheet 2.

Witnesses
Albert Popkins
Grace P. Brereton

Inventor
Frank Jones
by Sturtevant & Shurley
Attorneys

UNITED STATES PATENT OFFICE.

FRANK JONES, OF LIVERPOOL, ENGLAND.

CONDUIT FOR UNDERGROUND CONDUCTORS.

SPECIFICATION forming part of Letters Patent No. 696,737, dated April 1, 1902.

Application filed September 4, 1901. Serial No. 74,322. (No model.)

*To all whom it may concern:*

Be it known that I, FRANK JONES, building-material merchant, a subject of the King of Great Britain, residing at Liverpool, in the county of Lancaster, England, (whose full postal address is 30 Daulby street, Liverpool,) have invented certain new and useful Improvements in Conduits for Underground Conductors, (for which application for Letters Patent has been made in Great Britain, under No. 3,935, dated February 23, 1901,) of which the following is a specification.

This invention relates to the laying of underground electric conductors—such as wires, rods, tubes, &c.—in either a bare or in an insulated state, for distribution of electrical energy.

The main object of the invention is to provide a system whereby the metallic electric conductors may be successfully laid directly in their conduits while still naked—that is to say, without any of the usual preliminary insulating-coverings on the cables—the sole insulation being a filling of plastic material poured into the conduits after the bare conductors have been placed in position. The cost of installation for electric lighting or power is thus enormously reduced and the work of laying greatly facilitated by thus dispensing with the preliminary insulating-coverings, which not only make the cables very expensive as compared with naked cables or conductors, but render the same unwieldy and difficult to handle.

I am aware that telegraph-conductors have been laid naked in conduits filled with a solid or more or less plastic insulation; but the electric currents as used for telegraphic and like purposes present no serious difficulties of insulation. With cables and conductors for electric lighting and power, however, it is quite otherwise, and all attempts to lay conductors of this kind in a naked state have failed, owing to the conduits and the hardened insulation within them cracking under the frequent strains to which they are subjected by reason of their being underground. Cracks thus produced by admitting moisture would cause the insulation efficiency to at once break down. On the other hand, where plastic or soft insulation has been tried to avoid this cracking the flexibility of the material has been obtained only by the addition of substances which reduced the insulating properties of the filling to such an extent as to render its use quite impracticable. By my invention the laying of such naked conductors is rendered thoroughly practicable and efficient by the provision of a suitable insulation material for filling the conduits, the efficiency being still further assured by the further features of the invention, which comprises also means for obtaining a strong construction of conduit and means for more efficiently supporting the conductors in position in an insulating manner during the filling in of the conduit with the insulating material and afterward. It will be understood, however, that my improved system of underground conduits is equally applicable for both naked and covered cables or conductors.

Figure 2:
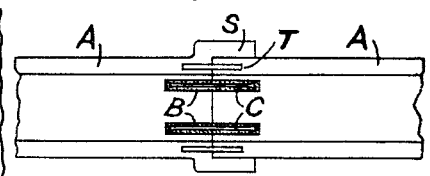
Figure 2:
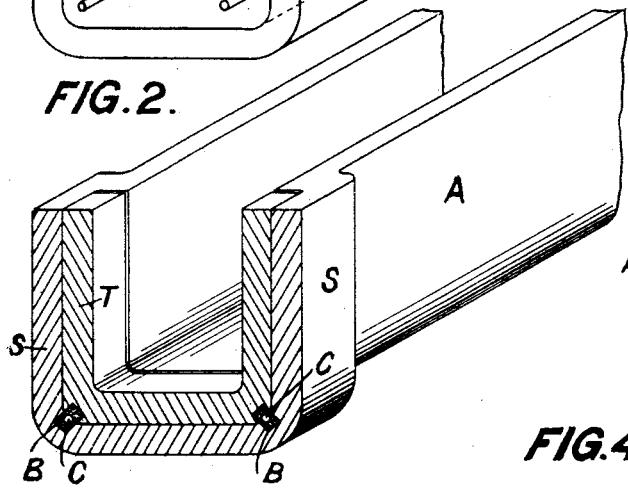
Figure 3:
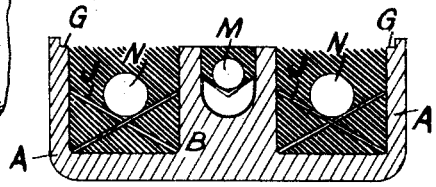
Figure 4:
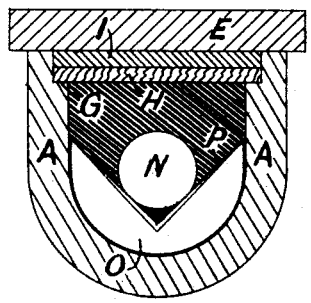
Figure 5:
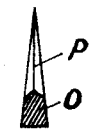
Figure 6:
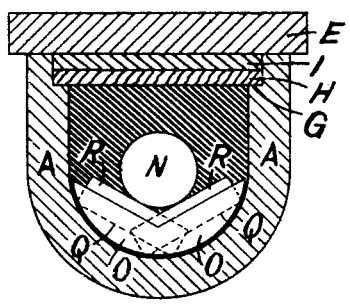

In the accompanying drawings, Figure 1 is a perspective view, and Fig. 1ᵃ a plan, of my conduit, showing dowel-pins for securing an interlocking connection, which prevents any vertical as well as lateral displacement of the respective lengths and providing a strong continuous conduit; Fig. 2, a perspective view of a trough, showing interlocking arrangement, partly on the outside of the spigot or plain end of a conduit length and partly on the inside face of the socket end. Fig. 2ᵃ is an elevation showing the connection of the abutting conduit ends by means of a loose socket; Fig. 3, a cross-section showing conduit with two or more ducts; Fig. 4, a cross-section through conduit, showing the arrangement of insulating-supports; Fig. 5, a section at right angles through bridge-piece; Fig. 6, a cross-section through conduit, also showing insulating-support. Figs. 7, 8, 9, and 10 are cross-sections through conduit, showing insulating-supports laid crosswise in the conduit.

I make my conduits A of earthenware, glazed or unglazed, terra-cotta, porcelain, wood, concrete, iron, or other suitable material in the form of a longitudinal trough, with sockets S at one end adapted to receive or embrace the plain end or spigot T of the adjacent length, thus constituting an open duct or conduit, as shown, for instance, in Fig. 1ᵃ in plan, or the conduit can be built up of bricks.

I make my individual lengths of conduits in such shapes and joint them together in such a manner that the continuous open duct A so formed is as rigid as it is possible to make it and is sufficiently strong in itself to withstand any ordinary strains to which it may be subjected by reason of its being buried beneath the surface of the ground. In addition to this, however, I provide a filling (hereinafter described) of such a nature and consistency that should the above conduits be displaced by any abnormal strain it (the filling) is sufficiently plastic to respond to the strain by slowly bending without cracking, thus insuring permanent protection to the conductor embedded therein, while also having a high insulation efficiency. Furthermore, in these troughs A in the inside I make longitudinal grooves or channels B, Fig. 1, and I place therein strips of metal or key-pieces C of suitable section and of such a size as not to quite fill the groove B, but to extend from the grooves in one trough to the grooves in the next—that is, they lap-joint as shown in Fig. 1ª. The grooves are filled with cement, and the strips of metal C, which are about nine inches, more or less, long, are forced down by hand-pressure into the cement in such a manner as to become thoroughly embedded therein and be surrounded by it, or I first place the strips of metal in position in the grooves and then fill in with the cement. I am thus able to strengthen the joints and secure an interlocking connection, which prevents any vertical as well as lateral displacement of the several lengths A, and, further, if the strips C be made of dovetail shape at the ends fitting into corresponding dovetail cavities in the cement, as seen in Fig. 1ª, they will resist any possibility of endways movement. The strips or key-pieces C being of a size which will not fill the grooves B enable the troughs A to be placed in curves and angles, so as to be suitable for turning the corners of streets and following bends in the streets. I provide a similar arrangement of grooves B at the top of the trough, filled with cement and having pieces of hoop or other iron D forced down by hand-pressure into the cement, or I first place the strips of metal in position in the grooves and then fill in with the cement, so as to lap over the abutting edges of the troughs. The ends of the irons D may be turned or hooked, as shown.

In another arrangement, Fig. 2, I form the grooves B partly on the outside of the spigot T at the side and partly on the inside face of the socket S adjacent thereto, and this groove when the troughs are placed together is filled with cement, and metallic strips or rods C are then forced into the soft cement.

In case the conduits are of wood or even of iron the connection of the several lengths may be effected by means of loose socket-pieces K, as shown in Fig. 2ª, in which the ends of the conduits abut and to which the conduits are firmly attached by screws L or by other suitable methods.

The conduits may, as depicted in Figs. 3 to 10, be made with a rabbet G, formed on the inside faces at the top. Resting on the shoulders so formed may be placed an inner lid H, of wood or other material, the same being covered over with a thin layer I of cement, clay, or other material. A further cover, consisting, preferably, of tiles E, may be placed on top.

Each trough may be made with two or more ducts, as shown in Fig. 3, all in a piece, to contain bare or insulated wires, rods, or other conductors. When thus made with ducts side by side, a longitudinal groove B can be provided between the ducts, in which a metallic bar M or other conductor is laid either continuous or merely overlapping at the joints, which groove is run in with cement or other material. In the case of three-wire systems this metallic bar or conductor M is made continuous and can be used as the common return-conductor. In such case it answers the double purpose of the return-wire, and also as a means of further strengthening the joints of the conduits.

Figure 7:
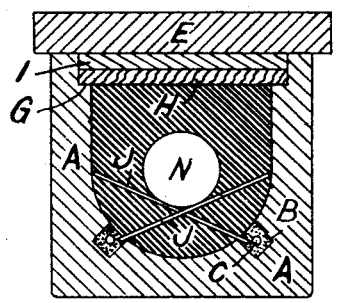
Figure 8:
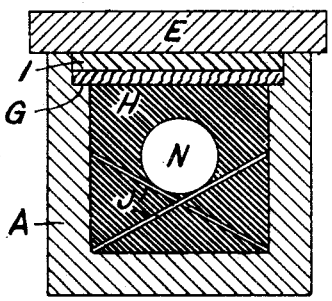
Figure 9:
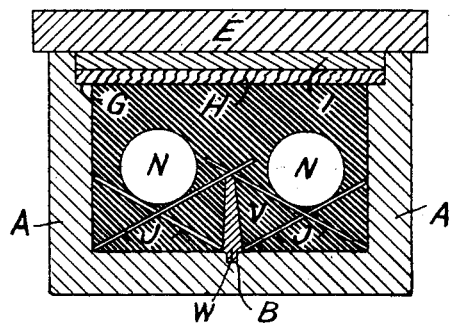

When the conduits are used to receive and contain insulated conductors, any usual bridge-pieces may be used to support them, but when bare or naked conductors are used on my improved system the naked wires or rods N are laid on special insulating-supports O, made of glass, vulcanite, or other efficient insulating substance, as depicted in Figs. 4 and 5, and which may also be used for insulated conductors. These supports are separate from the trough A, similar to the ordinary bridge-pieces, and are of such a shape as to fit therein and are sufficiently wide at bottom to stand upright in the trough. From the bottom, however, they gradually taper toward the top, as depicted in Fig. 5. Being thus made wider at the base than at the top, the tendency to turn over is reduced and sufficient support at base is formed, while the top approximates to a knife-edge, so as to keep the surface in contact with the conductor as small as possible. Its upper edge has a V-shaped recess P cut out therefrom, in which the conductor N rests and is kept central in the trough, or I take a piece of wood O or other material, as depicted in Fig. 6, with a V cut out of the upper side. In this piece I cut out two slits Q to receive two strips R, of glass or other material, laid on their edge, or I take two narrow strips of glass J or other non-conductor of any suitable shape, but usually with parallel edges, and insert them crosswise, as depicted in Fig. 7, in the conduit and transversely to the conduit with their faces or edges abutting, the conductor N resting on the upper V-space formed by the crossing of the strips J J. The lower ends of these strips of glass rest in the longitudinal grooves B, before referred to, which may be continuous throughout the conduit, as shown in Fig. 1, and the upper ends impinge on the inner face of the conduit A. By this arrangement there is a free space under the conductor at the insulating-supports J for the filling to enter. The strips can, if desired, be made flat, as shown in Fig. 1. Similar arrangements are shown in Fig. 8, in which the lower ends of the strips J abut against the bottom in the angle of the trough, and in Fig. 9, in which latter case an upright piece of wood V is mortised into the bottom of the conduit A and forms a support in the center for glass strips. This allows me to lay two conductors in each trough, as one end of one strip in each pair rests on the top of and is supported by this piece V. The support V may be securely fixed by splitting its lower end to receive a wedge W, which is driven farther in to expand the foot of the support by the act of driving the support into the groove B.

Figure 10:
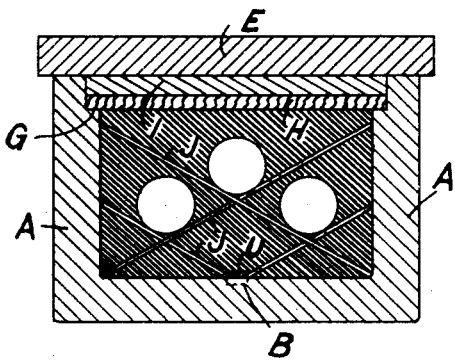

In Fig. 10 an arrangement is shown whereby three conductors can be laid in each trough. In this case projections or a rib U on the bottom of the trough serve to support two of a set of four strips J of glass or other non-conductor placed crosswise in the conduit in such a manner as to provide three V-spaces, on which the conductors rest. The lower ends of these strips J rest some in the corners of the trough and others against the rib U, while the upper ends impinge on the inner face of the conduit A. There is thus a free space under all three conductors at the insulating-supports for the subsequent filling of insulation to enter. The projections or rib U may be let into a recess or groove B, as shown by the dotted lines, or the strips J may be placed directly in the groove B without the rib U. In every case it is a matter of convenience whether projections or grooves be used to support the glass strips and whether they be provided to support either or both ends of the strips.

The conductors, whether previously covered or consisting simply of naked wires or rods, are surrounded in the duct with a filling of good insulating properties. Where the conductors are naked, I provide a filling of insulating material specially selected or treated in any convenient manner to free it from all mineral acids and alkaline and aqueous matters. By this means the laying of conductors in a naked state for electric lighting and power is rendered thoroughly practicable, as I have found that an insulation filling consisting, for instance, of coal-tar pitch, which has hitherto proved a failure either through being insufficiently yielding and liable to crack when used alone or through having its insulating properties too much weakened for the purpose of electric lighting and power, when treated with creosote or other oil or other substances to overcome the first-named difficulty of brittleness becomes thoroughly reliable when the mixture is free from all mineral acids and alkaline and aqueous matters. I have found that these acids and alkaline and aqueous matters, which are always more or less present, enormously reduce the insulation effect. A suitable mixture consists of coal-tar pitch with creosote or other oil added thereto in about the proportion of, say, from eight per cent. to twenty per cent., with possibly the addition of other substances, such as paraffin-wax or vegetable pitch. All the materials are specially selected to be free from the said mineral acids or alkaline and aqueous matters, or if such are found to be unavoidably present they are removed or neutralized in any known manner. Even coal-tar alone if specially watched or tested during its distillation and the latter stopped at a point where the residue is of the right consistency and neutrality, which has not hitherto been done, with the possible addition of other substances, such as paraffin wax or vegetable pitch, will be found suitable for the purpose of the invention.

The filling is poured into the conduit while in a molten state, so as to surround the conductors and their supports and fill the trough. If the mixture is at all brittle, more creosote-oil or the like should be added. Tiles or lids are then placed on top of the conduit and set so as to form a solid conduit, with the conductors firmly bedded inside and surrounded by the insulating material, the lids pressing the filling into the channel and forming a compact mass. The filling is of such a nature that it will set more or less solid at ordinary temperature.

I declare that what I claim is—

1. A system of underground conductors for the distribution of electrical energy for lighting or power, comprising a strong construction of conduits, conductors consisting of naked wires or rods within said conduits, and a filling of insulation within the conduits and about the conductors, said filling being of material having highly-insulating properties suited to currents of this nature and adapted to set more or less hard without becoming brittle, substantially as hereinbefore set forth.

2. A system of underground conductors for the distribution of electrical energy for lighting or power, comprising a strong construction of conduits, conductors consisting of naked wires or rods within said conduits, supports of highly-insulating material adapted to retain the conductors in position, and a filling of insulation within the conduits and about the conductors, said filling being of material having highly-insulating properties suited to currents of this nature and adapted to set more or less hard without becoming brittle, substantially as hereinbefore set forth.

3. In a system of underground conductors for the distribution of electrical energy for lighting or power, the combination with the conduits and the conductors therein, of a conduit-filling of highly-insulating material adapted to set more or less hard without becoming brittle and which is thoroughly neutral or free from all mineral acids and alkaline and aqueous matters substantially as described.

4. In a system of underground conductors for the distribution of electrical energy for lighting or power, the combination with the conduits and the conductors therein, of a conduit-filling of coal-tar pitch and softening materials, said filling being thoroughly neutral or free from all mineral acids and alkaline and aqueous matters, substantially as described.

5. In a system of underground conductors for the distribution of electrical energy for lighting or power, the combination with the conduits, of a non-brittle filling of coal-tar pitch and creosote-oil therein, said filling being thoroughly neutral or free from all mineral acids and alkaline and aqueous matters, and conductors within said conduits consisting of naked wires or rods bedded in the filling, substantially as described.

6. In a system of underground conductors for the distribution of electrical energy for lighting or power, the combination with the conduits and the conductors, of conductor-supports consisting of loose strips of insulating material inclined and arranged crosswise in the conduits, substantially as described.

7. In a system of underground conductors for the distribution of electrical energy for lighting or power, the combination with the conduits and the conductors of inclined loose strips of insulating material arranged crosswise in the conduits to form conductor-supports and means for supporting said strips in that position, substantially as described.

8. In a system of underground conductors for the distribution of electrical energy for lighting or power, the combination with the conduits and the conductors, of loose strips of insulating material inclined and arranged crosswise in the conduits to form supporting-clefts for a plurality of conductors and adapted to prevent said conductors from coming in contact with the conduit and with each other, and means for supporting said strips in that position, substantially as described.

9. In a system of underground conductors for the distribution of electrical energy for lighting or power, the combination with the conduits and the conductors, of strips of insulating material inclined and arranged crosswise in the conduits to form independent supporting-clefts for a plurality of conductors, the inner lower face of the conduits having a central groove and supports in said groove for the adjacent ends of said strips, substantially as described.

10. In a system of underground conductors for the distribution of electrical energy for lighting or power, the combination of a series of conduit lengths having longitudinal grooves adapted to meet at the joints, of metallic dowel or key pieces located in said grooves to lap the joints, and a filling of cement in the grooves adapted to bind the several parts, substantially as described.

11. In a system of underground conductors for the distribution of electrical energy for lighting or power the conduit lengths having internal grooves running longitudinally in a continuous manner, and adapted to contain dowels or key pieces to lap the joints with a filling to bind them therein, and insulating-supports for the conductors in the conduit lengths; substantially as described.

12. In a system of underground conductors for the distribution of electrical energy, for lighting or power, the combination with the conduits and an insulating-filling therein about the conductors, of wood covers bedded onto the filling below the top of the conduit-walls, and a layer of cement on said covers in a space up to the top of conduit, substantially as described.

13. In a system of underground conductors for the distribution of electrical energy, for lighting or power, the combination with the conduits and an insulating-filling therein about the conductors, of wood covers bedded onto the filling below the top of the conduit-walls, a layer of cement on said covers in a space up to the top of conduit, and a solid cover over all, substantially as described.

14. A system of underground conductors for the distribution of electrical energy for lighting or power, comprising conduit A having multiple ducts conductors N insulatingly supported in said ducts, and surrounded with insulation therein, longitudinal groove B, between the ducts and metallic rod M embedded in a filling in said groove adapted to lap the conduit-joints for the purpose of imparting strength thereto and of carrying the return-current, substantially as described.

15. In a system of underground conductors for the distribution of electrical energy, for lighting or power, the combination of conduit A, groove B, support U held in said groove, and inclined strips J of highly-insulating material, coacting with the support U to support three conductors N within the conduit out of direct contact with the support U and conduit, substantially as described.

In witness whereof I have hereunto signed my name, this 22d day of August, 1901, in the presence of two subscribing witnesses.

FRANK JONES.

Witnesses:
JOSEPH J. ROYDEN,
F. P. EVANS.